May 9, 1950     D. T. AYERS, JR     2,506,851
DOOR LOCKING SYSTEM
Filed May 7, 1946     2 Sheets-Sheet 1
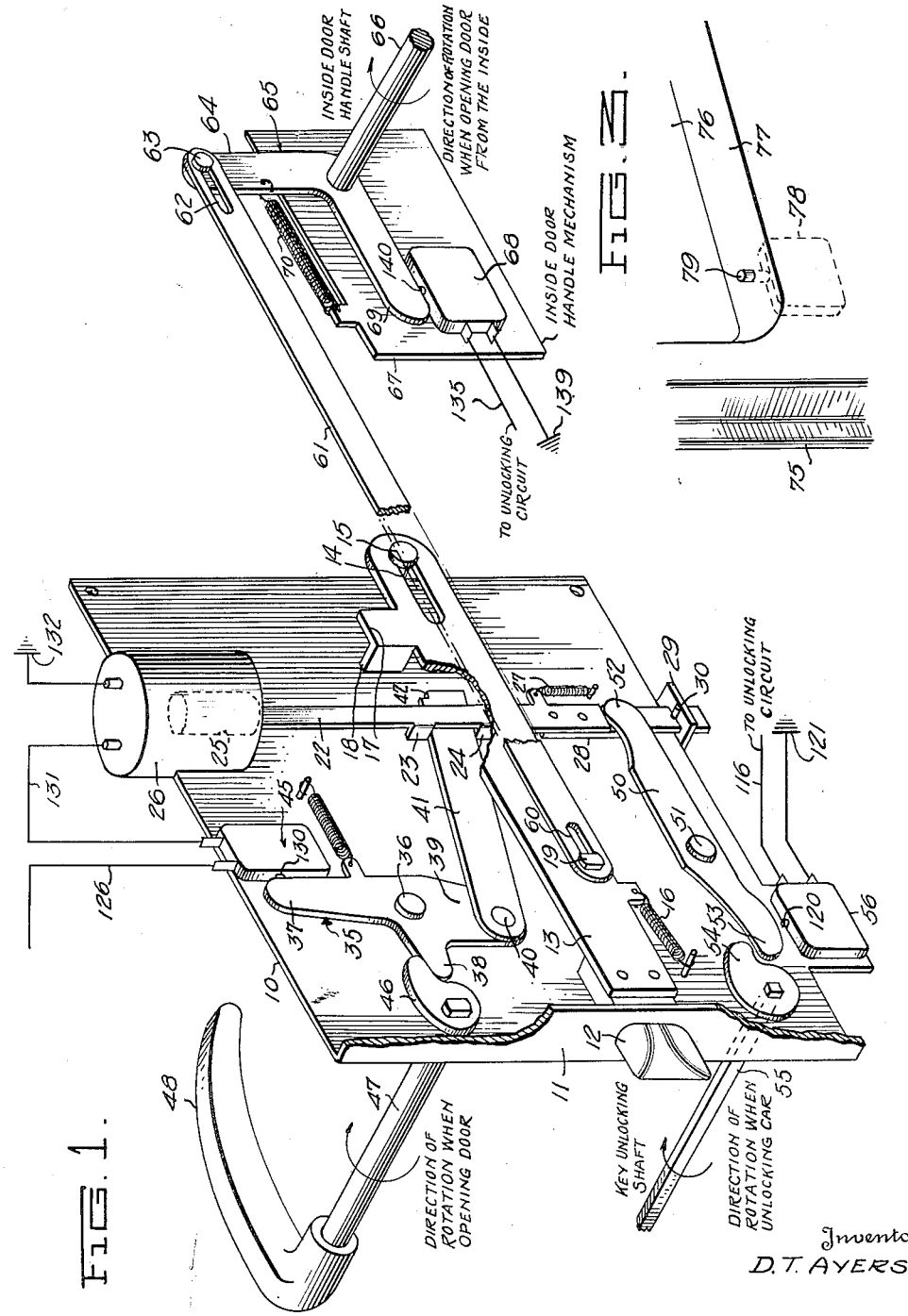
Inventor
D. T. AYERS Jr.
By [signature]
Attorney May 9, 1950  D. T. AYERS, JR  2,506,851
DOOR LOCKING SYSTEM
Filed May 7, 1946  2 Sheets-Sheet 2

Inventor
D. T. AYERS JR.

Patented May 9, 1950

2,506,851

UNITED STATES PATENT OFFICE 2,506,851

DOOR LOCKING SYSTEM

David T. Ayers, Jr., Richmond, Va., assignor to Automatic Shifters, Inc., Richmond, Va., a corporation of Virginia Application May 7, 1946, Serial No. 667,924

16 Claims. (Cl. 70—264)

This invention relates to a door latch control mechanism, particularly for motor vehicle doors, and is an improvement over the system shown and described in the copending application of Jeannot G. Ingres and David T. Ayers, filed April 17, 1946, Serial No. 662,870 now Patent No. 2,459,029, dated January 11, 1949.

In the copending application referred to there is disclosed and claimed a system for controlling the latches of motor vehicle doors in a novel manner, both front doors preferably being provided with a push button either of which may be depressed when leaving the car to lock all of the doors of the vehicle. The system is provided with means whereby the pressing of one of the buttons referred to conditions the latches of all of the doors to be locked, and the insertion and turning of the key in one door lock will unlock all of the doors. Moreover, the system is operative to permit a driver to lock himself or herself in the car while driving, and the operation of an inside door handle when a person leaves the vehicle automatically unlocks the system. This prevents the inadvertent locking of the vehicle when leaving it.

As is well known, it is possible in vehicle door locking systems, including the system described in the co-pending application referred to, for the driver to leave the vehicle and lock the doors with the ignition switch key in the car. In modern motor vehicles, the same key is employed for the door locks, and when the ignition key is locked in the vehicle, therefore, the driver cannot enter the vehicle when returning to it.

An important object of the present invention is to provide a novel door locking system, preferably of the type disclosed in the co-pending application referred to, wherein the door locking system is inoperative if the driver turns off the ignition and then attempts to leave the vehicle and lock the doors.

A further object is to provide a novel system of the character referred to which is operative for locking the doors with the ignition key in position, provided the ignition key is turned on, thus making it possible to lock in the occupants of a vehicle while driving.

A further object is to provide a system of the character referred to which includes a master locking circuit, the operation of which is dependent upon the operation of a master switch, and to include in such circuit a novel switch controlled by the ignition key, to render the master switch operative to permit the doors to be locked if the ignition switch is in place and turned on or if it is removed, but not if the ignition is turned off and the key left in the switch, thus making it impossible for the driver to lock the doors when leaving the car if he has turned off the ignition and left the key in the switch.

Other objects and advantages of the invention will become apparent during the course of the following description.

In the drawings I have shown one embodiment of the invention. In this showing—

Figure 1 is a perspective view of a locking mechanism associated with one of the front doors of a vehicle, parts being broken away and some of the electrical connections being diagrammatically illustrated, Figure 2 is a diagrammatic showing of the electrical devices employed in the system showing the various control circuits, Figure 3 is a fragmentary perspective view of a portion of one of the front vehicle doors showing the preferred location of the push buttons operable for locking the doors, and Figure 4 is a detail sectional view on line 4—4 of Figure 2.

In Figure 1, a latch mechanism for one of the front vehicle doors of a motor vehicle is illustrated. Referring to Figure 1, the numeral 10 designates a carrier plate conventionally employed in most motor vehicles. This carrier plate is housed within the door and is flanged at one end as at 11 at the free edge of the door. A latch bolt 12 is slidable through the flange 11 and is connected to the adjacent end of a flat bar 13 the opposite end portion of which is slotted as at 14 to receive the shank of a guide pin 15 carried by the plate 10. The bolt 12 and its operating bar 13 accordingly are supported for linear movement toward and away from the keeper (not shown) for the latch 12, and a spring 16 is connected to the bar 13 and plate 10 to urge the latch bolt 12 toward latching position. Toward its end remote from the latch bolt 12, the bar 13 is provided with an upwardly extending portion 17 having an inturned end 18 for a purpose to be described. The bar 13 is also provided with a headed pin 19 through which the door may be unlatched from an inside handle mechanism to be referred to later.

A control rod 22 is vertically arranged as shown in Figure 1 between the body of the plate 10 and the bar 13 and is provided with laterally extending fingers 23 and 24 for a purpose to be described. The upper end of the rod 22 is connected to the armature 25, to be referred to later, of a solenoid 26 energizable to move the rod 22 upwardly. A spring 27 urges the rod 22 downwardly, and the lower end of this rod is connected to an offset extension 28 slidable in a guide lip 29 extending laterally from the plate 10. A stop pin 30 engages the lip 29 to limit downward movement of the bar 22 and its extension 28.

A lever indicated as a whole by the numeral 35 is pivoted as at 36 to the plate 10 and is provided with three arms 37, 38 and 39. The arm 39 is connected by a pin 40 to a bar 41 the opposite end portion of which is arranged between the fingers 23 and 24. The bar 41 has its free end normally arranged lower than the finger 18 so that turning movement of the lever 35 would move the end of the bar beneath the finger 18 without imparting movement thereto. It will become apparent that when the solenoid 26 is energized, the finger 24 raises the free end of the bar 41 to position it for engagement with the finger 18 to impart unlatching movement to the bar 13. The free end of the bar 41 preferably has its upper corner portion right-angularly notched as at 42 for a purpose to be described.

The lever arm 37 is arranged to control a small switch indicated as a whole by the numeral 45, and as will be described later, the normal position of the lever arm 37 holds the switch 45 open. The lever arm 38 is engageable by an arm 46 carried by the shaft 47 to which the usual outside door handle 48 is connected. Rotation of the shaft 47 in the direction of the arrow in Figure 1 will effect the unlatching of the latch bolt 12 to permit the door to open, but this is dependent upon energization of the solenoid 26 by movement of the arm 37 from the switch 45, which operation will be referred to more in detail later.

Near the bottom of the plate 10 is arranged a lever 50 pivotally connected to the plate as at 51. One end of the lever 50, as indicated by the numeral 52, lies against the projection 28 beneath and adjacent lower extremity of the bar 22. The other end 53 of the lever 50 is engageable by an arm 54 carried by the usual shaft 55 controlled by the key-operated lock (not shown). Beneath the lever end 53 is arranged a normally open switch 56 which is adapted to be closed upon substantial downward movement of the lever end 53 incident to rotation of the key-operated shaft 55 in the direction of the arrow in Figure 1.

The pin 19 is operable in a slot 60 formed in a link 61. The opposite end of this link is slotted as at 62 to receive a pin 63 carried by one arm 64 of a bell crank lever 65 connected to the shaft 66 of the usual inside door handle associated with motor vehicle doors. The shaft 66 extends through a plate 67 adjacent to which the bell crank lever 65 is arranged. A normally open switch 68 is carried by the plate 67 and is adapted to be closed by movement of the other arm 69 of the bell crank lever upon a door-unlatching turning movement of the shaft 66 in the direction of the arrow in Figure 1. A spring 70 holds the bell crank lever 65 in the normal position shown in Figure 1, in which position the lever arm 69 holds the switch 68 open.

Assuming that the apparatus is employed with a four-door sedan, the mechanism shown in Figure 1 will be employed for each front door of the vehicle. The same mechanism also will be employed for the two rear doors except that the key-operated shaft 55 and associated elements, including the lever 50 and switch 56, and the switch 68 associated with the inside door handle, will be omitted.

It will be noted that only one solenoid is used in conjunction with the latch mechanism of each vehicle door. It also will be noted that three small, simple switches are employed for each front door, and only one switch, namely the switch 45, is employed for each rear door. These electrical elements are quite small and cheaply manufactured and are available as standard articles of manufacture. An additional small manually controlled switch is associated with each front door. Referring to Figure 3, a portion of one of the front doors of the vehicle has been illustrated and indicated by the numeral 75. This door has the usual window 76 having a lower sill 77, and the additional switch referred to is arranged within the door beneath the sill 77 as indicated by the numeral 78. This switch is operable by a push button 79 projecting upwardly through sill 77 adjacent the free edge of the door 75. One of these switches and a control circuit therefor is preferably provided for each front door and either of these switches may have its push button 79 operated to effect the locking of all of the vehicle doors, as will be described.

The wiring system for the mechanism is shown diagrammatically in Figure 2 and the mechanism associated with each individual door has been enclosed within a dotted line rectangle designated by suitable legends to indicate the respective doors. Referring to Figure 2, numeral 85 indicates as a whole the master switch through which the locking and unlocking functions of the apparatus are controlled. This master switch may be located at any desired inaccessible and invisible point in the vehicle, for example, behind the instrument panel, and is suitably housed. The master switch comprises a pair of solenoids 86 and 87 respectively provided with armatures 88 and 89 connected to a switch lever 90 pivoted intermediate the armatures as at 91. The lever 90 is provided with a projected end 92 to which is connected an over-center spring 93 for holding the lever 90 in either of its two positions to be referred to. A lateral projection 94 on the lever 90 is engageable with a switch arm 95 whereby, upon energization of the solenoid 87, such switch arm will be moved into engagement with a stationary contact 96.

A source of current, such as the vehicle battery, is indicated by the numeral 100, and has one terminal grounded as at 101. A main supply wire 102 is connected to the other terminal of the battery and is provided with branches 103 and 104 each of which is connected to one terminal of one of the solenoids 86 and 87. The wire 102 leads to the stationary contact 96.

The second terminal of the solenoid 86 is connected to one end of a wire 105 in which is arranged an ignition key controlled switch, forming the principal subject matter of the present invention and described in detail below. The wire 105 branches as at 106 for connection with stationary contacts 107 arranged in the switches 78. Each of these switches includes an arm 108 normally held out of engagement with its contact 107 by its spring 109 and movable into engagement therewith by operation of the associated push button 79. The arm 108 of each push button switch is grounded at 110.

The second terminal of the solenoid 87 is connected to one end of a wire 115 which branches as at 116 for connection with switch arms 117 in each of the key-operated switches 56. Each of these switch arms is normally out of engagement with an associated stationary contact 118 and is held in normal position by a spring 119. Each switch arm 117 is provided with an operating button 120 engageable by the lever end 53 (Figure 1) to close the switch upon operation of the associated key-operated shaft 55 (Figure 1). Each stationary contact 118 is grounded as at 121.

The switch arm 95 of the master switch is connected to one end of a wire 125 and this wire is provided with four branches 126. Each of these branches leads to a stationary contact 127 in each of the switches 45. Each switch 45 is provided with a switch arm 128 engageable with the associated contact 127 and normally held out of engagement therewith by a tension spring 129. Each switch arm 128 is provided with an operating button or the like 130 normally engaged by the associated lever arm 37 (Figure 1) to keep the switch arms 128 in open position. Each switch arm 128 is connected by a wire 131 to one terminal of the associated solenoid 26, and the other terminal of each of these solenoids is grounded as at 132.

It is highly desirable to provide in such a system a cooperating means whereby an operator will be prevented from inadvertently leaving the vehicle with the system set for locking the doors. In other words, assuming that the driver may have purposely locked the doors while he is in the vehicle by having depressed one of the buttons 79 (Figure 3) or by having accidentally depressed such button with his hand or elbow, he may later leave the vehicle and close the doors with the ignition key still in the ignition switch. He will thereafter, upon returning to the vehicle, find it impossible to gain entrance thereinto. The switches 68, which may be associated only with the front doors of a four-door vehicle are employed for preventing the driver from inadvertently locking himself out of the vehicle. Referring to Figure 2, each branch wire 116 is provided with a further branch wire 135 leading to a switch arm 136 in each of the switches 68. Each switch arm is urged by a compression spring 137 into engagement with a stationary contact 138, grounded as at 139. Each switch arm 136 is provided with an operating finger 140 or the like normally engaged by the lever arm 69 (Figure 1) of the inside door handle mechanism whereby the switch arms 136 are normally held open. As will become apparent, the opening of either front door from the inside will result in closing one of the switch arms 136 to unlock the entire system.

The foregoing description covers the locking system as described and illustrated in the copending application referred to above, and is the type of system with which the present improvement is particularly adapted to be used. As will be further described below, the system is such that a person leaving a motor vehicle need merely close one of the switches 108 by pushing the associated push button 79 to lock the entire vehicle when leaving it. The system is also such that operation of one of the inside door handles, as described above, will unlock the entire mechanism, thus preventing anyone from leaving the car inadvertently locked. However, the system does not prevent the operator from locking the car with the ignition key in the switch. In most present-day vehicles the same key is used for the ignition, door locks and trunk of a motor vehicle and accordingly if the key is inadvertently locked in the car, the operator will have no way of re-entering the car unless he happens to have a spare key with him.

The present invention is concerned particularly with the controlling of a locking system of the character referred to so that the operator, while in the vehicle with the motor running can lock the doors against entrance thereinto from the outside, while at the same time preventing the locking of the doors if the ignition switch is turned off.

Referring to Figure 2, it will be noted that the system is provided with a control switch indicated as a whole by the numeral 150 in series with the locking solenoid 86. This switch may be conveniently connected in the wire 105 and comprises a stationary contact 151 and a switch arm 152 biased to closed position by a spring 153. The switch arm 152, being in series with the locking solenoid 86, it is obvious that this solenoid cannot be energized by closing one of the switches 108 if the switch 152 is open.

The switch 150 is associated with the ignition lock indicated as a whole by the numeral 155. This lock comprises the usual body 156 having a barrel 157 therein in which the ignition key 158 is insertable. This key is provided with the usual notches for operating the tumbler pins of conventional type all but one set of which are indicated by the numeral 159. These tumbler pins are all biased to locking position by springs 160. In accordance with the usual practice each set of tumbler pins is in two parts and the abutting ends of these pins coincide with the cylindrical surface of the barrel 157 when the key is in the lock, thus permitting the barrel 157 to be rotated.

In the present invention, an additional set of tumbler pins is provided, the inner one being indicated by the numeral 164 and the outer one by the numeral 165. The abutting ends of these two pins coincide with the surface of the tumbler 157 when the key is inserted in the lock, as is true of the other tumbler pins referred to. The spring 153, associated with the switch 152, urges the tumbler pin 165 inwardly to locking position, and when the key is inserted in the lock, the pins 164 and 165 move to an ignition unlocking position, and they simultaneously open the switch 152, this being the condition illustrated in Figure 2. It will be obvious, therefore, that with the key 158 in the ignition lock and in the off position illustrated in Figure 2, the locking solenoid 86 cannot be energized and the vehicle doors accordingly cannot be locked.

It is highly desirable, however, to permit the driver of a vehicle to lock himself or herself in the car while driving to prevent unauthorized entrance into the vehicle. This is provided for in the present construction. Referring to Figure 4 it will be noted that the barrel 157, in the transverse plane of the pin 164, is cut away as at 178 to provide a cam. When the key 158 is in the lock with the ignition turned off, the barrel 157 is in the position shown in Figures 2 and 4, in which case, the switch 152 is open and the doors cannot be locked. To turn on the ignition, the operator will rotate the key in a counterclockwise direction as viewed in Figure 4, in which case the pin 164 will be turned angularly toward the left out of alignment with the pin 165, and when the ignition switch (not shown) reaches the "on" position, the lower end of the pin 165 will rest in the lowermost portion of the cam groove 168. In this position of the pin 165, the switch 152 will be closed and the operator can energize the locking solenoid 86 in the manner described in detail below.

The operation of the apparatus is as follows: The master switch 85 is normally arranged with the lever 90 swung clockwise to its normal position holding the switch arm 95 in engagement with the contact 96. Under such conditions, a circuit is closed through each of the solenoids 26 except at the respective switches 45. These switches are normally open, as stated above, and accordingly no current normally flows through the solenoids 26. Assuming that the operator is outside the car and desires to enter thereinto, he will operate one of the handles 48 in the usual manner, turning the associated shaft 47 in the direction of the arrow in Figure 1. The arm 46 will turn in the same direction and, in engaging the lever arm 38, will rock the lever 35 in a counterclockwise direction. The lever arm 37 thus will start to move generally toward the left in Figure 1, and the first increment of movement of the lever 35 thus will release the switch arm 128 of the associated switch 45, the lever arm 37 relieving pressure on the button 130. This will complete a circuit through the associated solenoid 26 to ground 132 and through ground 101 back to the source 100.

Energization of the solenoid 26 will lift the armature 25 and the associated bar 22 and the finger 24 will elevate the bar 41 into a position in alignment with the finger 18. Continued operation of the handle 48 will then continue the counterclockwise rotation of the lever 35 and the bar 41 will exert a pressure on the finger 18 to move the latch bolt bar 13 and latch 12 to the right to unlatch the door. The door thus may be opened manually in the usual manner, and when the operator releases the handle 48, the parts operated thereby will return to their normal positions with the lever arm 37 depressing the previously operated button 130 to open the associated switch 45. The associated latch-operating bar 41 will thus be dropped below the finger 18 to its normal position.

Assuming that the operator will have operated the handle 48 with extreme rapidity, it is possible that the upper corner of the free end of the bar 41, in the absence of the notch 42, might have moved beneath the finger 18 during such complete rapid movement of the handle 48. In practice, it has been found that by providing the notch 42, such inadvertent operation is prevented. If the free end of the bar 41 reaches a position with its extremity in vertical alignment with the forward face of the finger 18 before the upper edge of the bar 41 moves to a position above the lower extremity of the finger 18, the inner extremity of the notch 42 will engage the finger 18 and unlatch the door in the manner previously described.

It will be apparent that the circuit through either solenoid 26 may be closed by operation of its associated switch arm 128, but the circuit to each solenoid 26 is dependent upon the position of the parts of the master switch 85. The circuits through all of the solenoids 26 will be prevented from being closed by operation of either outside door handle if the switch arm 95 is out of engagement with the contact 96. This is the condition which is established when all of the car doors are to be locked. If the driver desires to leave the vehicle and lock the doors, he may open either front door to leave the vehicle therethrough and may press the push button 79 associated with such door. Under such conditions, assuming that the ignition key 158 has been removed, current will flow from the source 100 through wires 102 and 103, solenoid 86, wire 105 and either wire 106, dependent upon which front door push button is operated, thence through the associated contact 107 and switch arm 108 and back to the battery through grounds 110 and 101. The locking solenoid 86 thus will be energized and its armature 88 will swing the lever 90 to the position shown in Figure 2, the switch arm 95 being disengaged from the contact 96. The main control circuit, having thus been broken between contact 95 and switch arm 96, the operation of an outside door handle will not close a circuit through the associated solenoid 26 and the door cannot be opened. Under such conditions, a door-opening operation of the handle 48 will move the associated bar 41 while the latter remains in its lower position and the free end of the bar will merely move beneath the finger 18, and accordingly no motion can be imparted to this finger or to the latch bar 13 and latch bolt 12. The door thus will remain latched.

Assuming that the operator has forgotten to remove the ignition key when turning off the motor, the key 158 will occupy the position shown in Figures 2 and 4 and the act of turning off the ignition will have resulted in the cam groove 168 (Figure 4) moving the pin 164 upwardly to transmit similar movement through the pin 165 to open the switch 152. When the operator then leaves the vehicle, the locking circuit described above cannot be closed since the switch arm 152 will be in series with the locking solenoid 86. Everyone, when locking vehicle doors, instinctively turns the door knob on the outside to assure himself that the doors are locked before leaving the vehicle. Under the conditions just referred to, the operator will find that the doors are not locked and will immediately appreciate the fact that he has left the ignition key in the switch.

Upon removal of the ignition key, the pin 164 will drop and the spring 153 will urge the switch arm 152 to its closed position. The operator may thereupon depress one of the buttons 79, and the locking circuit will be energized in the manner described above.

When the operator returns to the car and desires to unlock the doors, he will insert a key in the lock of conventional construction (not shown) provided in each front door and will turn the key and consequently the associated shaft 55 (Figure 1) in the direction indicated by the arrow. The arm 54 will engage the lever end 53 and move it downwardly until it engages and moves the associated button 129 downwardly, whereupon the corresponding switch arm 117 will engage the stationary contact 118. The current will then flow from the battery 100 through wires 102 and 104, through solenoid 87 and wire 115, through one of the wires 116, depending upon which front door lock is being operated, thence through the corresponding switch 117 and contact 118 and back to the source through grounds 121 and 101. This operation energizes solenoid 87 and the armature 89 will swing the arm 90 back to its normal position to engage the switch arm 95 with the contact 96. The control circuits will then be restored to their normal conditions and either door handle may be operated to open the corresponding door. Thus it will be apparent that the mere turning of the key in one of the locks will simultaneously restore all of the door control circuits associated with the outside handles and either vehicle door may be opened from the outside.

The over-center spring 93 is employed for holding the switch lever 90 in either of its two positions after it has been moved to such position. As is true of all of the circuits in the apparatus, the circuits for the solenoids 86 and 87 are only momentarily closed, thus minimizing the drain on the battery, and the master switch parts will remain indefinitely in either position to which they are moved.

It is becoming the increasing practice, as a matter of safety, for drivers, and particularly women, to lock the doors of a motor vehicle while they are driving or remaining inside of the vehicle. It will be apparent that the driver of a vehicle equipped with the present system may push one of the buttons 79 at any time, assuming that the ignition is turned on, and the doors of the vehicle will be locked. In this connection, it will be noted that so long as the ignition key is "on," the pin 165 will be lowered into the cam groove 168 and the switch arm 152 will be closed, thus permitting an occupant of a vehicle to lock himself in. Thus the occupant is protected against the unauthorized entrance of anyone into the vehicle, for example a bandit attempting to enter the vehicle while the latter is stopped by a traffic light. However, if the motor is stopped by turning off the ignition switch, the switch arm 152 will be opened to prevent the operator from leaving the vehicle and locking it with the ignition key in the ignition switch. Under all conditions in which the locking of the vehicle doors is desirable, therefore, the locking solenoid 86 can be energized at any time by pushing one of the buttons 79.

Assuming that the operator has locked the doors while inside of the vehicle, the solenoid 86 will have been energized to open the master switch 94. When the ignition switch 158 is then turned off and the switch 152 is opened in the manner described, it will have no effect on the system, the master switch 94 merely remaining open. If the driver then desires to leave the vehicle, regardless of whether the doors are to be locked, the turning of one of the inside door handles (not shown) to turn the associated shaft 66 in the direction of the arrow in Figure 1, manually pulls the bar 61 to unlatch the door. At the same time, the lever arm 69 will move upwardly to release the associated button 140 and the corresponding switch arm 136 will engage the stationary contact 138.

Each of the switches 68 is in parallel with its associated key-operated switch 56 and functions in the same manner to energize the unlocking solenoid 87. Thus if the car has been locked from the inside, the mere opening of the door will result in energizing the unlocking solenoid 87 to restore the unlocking position of the master switch. Thereafter, the master switch cannot be again operated by the locking solenoid 86 until the ignition key has been removed from the lock in the manner stated.

It is therefore possible for the operator to lock himself in the car so long as the engine is running, but it is impossible for him to leave the car without energizing the unlocking solenoid 87. It is thereafter impossible for him to lock the car with the ignition key in the switch since another operation of the locking solenoid 86 is required and such operation cannot be performed until the ignition key is removed.

I claim:

1. In a locking mechanism for a door of a motor vehicle wherein the door is provided with a latch bolt, and means for operating the latch bolt to release it comprising a door handle, and wherein the vehicle has a key-operated ignition switch movable by a key between "on" and "off" positions; a device movable between a first position in which said handle is operative to release the latch bolt and a second position in which the handle is inoperative for releasing the latch bolt, said device being biased out of said first position, means operable upon initial operation of the handle for moving said device to said first position, manually controllable means operable for rendering said last-named means ineffective for moving said device to its first position, and means operated by the turning of the ignition key to "off" position for preventing operation of said manually controllable means.

2. In a locking mechanism for a door of a motor vehicle wherein the door is provided with a latch bolt, and means for operating the latch bolt to release it comprising a door handle, and wherein the vehicle has a key-operated ignition switch movable by a key between "on" and "off" positions; a device movable between a first position in which said handle is operative to release the latch bolt and a second position in which the handle is inoperative for releasing the latch bolt, said device being biased out of said first position, means operable upon initial operation of the handle for moving said device to said first position, manually controllable means operable for rendering said last-named means ineffective for moving said device to its first position, and electrical means including a circuit controlled by the ignition switch and opened when the ignition key is turned to "off" position for preventing operation of said manually operable means.

3. In a locking mechanism for a door of a motor vehicle wherein the door is provided with a latch bolt, and means for operating the latch bolt to release it comprising a door handle, and wherein the vehicle has a key-operated ignition switch movable by a key between "on" and "off" positions; a device movable between a first position in which said handle is operative to release the latch bolt and a second position in which the handle is inoperative for releasing the latch bolt, said device being biased out of said first position, electro-magnetic means for moving said device to said first position upon initial operation of the door handle, a circuit for said electro-magnetic means including a door handle-operable switch, and a control circuit energizable for preventing said switch from closing said first-named circuit, said control circuit including an ignition key-controlled switch movable to open position when the ignition key is turned to "off" position.

4. In a locking mechanism for a door of a motor vehicle wherein the door is provided with a latch bolt, a handle for releasing the latch bolt, a member movable to a first position in which the handle is operative for releasing the latch bolt and to a second position in which the handle is inoperative for releasing the latch bolt, the vehicle having a key-operated ignition switch movable between "on" and "off" positions; said member being biased to said second position, a solenoid energizable for moving said member to said first position, a circuit for said solenoid, a control switch in said circuit movable to closed position upon initial operation of the handle, a master switch in said circuit movable between open and closed positions, and electro-magnetic control means for said master switch comprising a circuit including an ignition key-controlled switch movable to open position when the ignition switch is in "off" position for preventing said electro-magnetic control means from closing said master switch.

5. In a locking mechanism for a door of a motor vehicle wherein the door is provided with a latch bolt, a handle for releasing the latch bolt, a member movable to a first position in which the handle is operative for releasing the latch bolt and to a second position in which the handle is inoperative for releasing the latch bolt, the vehicle having a key-operated ignition switch movable between "on" and "off" positions; said member being biased to said second position, a solenoid energizable for moving said member to said first position, a circuit for said solenoid, a control switch in said circuit movable to closed position upon initial operation of the handle, a master switch in said circuit movable between open and closed positions, an electro-magnetic device energizable for moving said master switch to closed position, a second electro-magnetic device for moving said master switch to open position, and a circuit for said second electro-magnetic device comprising an ignition key-operated switch movable to open position by movement of the ignition key to "off" position.

6. In a locking mechanism for a door of a motor vehicle wherein the door is provided with a latch bolt, a handle for releasing the latch bolt, a member movable to a first position in which the handle is operative for releasing the latch bolt and to a second position in which the handle is inoperative for releasing the latch bolt, the vehicle having a key-operated ignition switch movable between "on" and "off" positions; said member being biased to said second position, a solenoid energizable for moving said member to said first position, a circuit for said solenoid, a control switch in said circuit movable to closed position upon initial operation of the handle, a master switch in said circuit movable between open and closed positions, an unlocking solenoid energizable for closing said master switch, a circuit for such solenoid including a door key-operated switch, a locking solenoid for opening said master switch, and a circuit for said locking solenoid comprising an ignition key-operated switch movable to open position when the ignition key is turned to "off" position.

7. In a locking mechanism for a door of a motor vehicle wherein the door is provided with a latch bolt, and means for operating the latch bolt to release it comprising a door handle, and wherein the vehicle has a key-operated ignition switch movable by a key between "on" and "off" positions; a control circuit energizable for rendering said operating means inoperative for releasing the latch bolt upon operation of the door handle, said circuit including a pair of switches one of which is manually operable, and means for controlling the other of said switches in accordance with the position of the ignition switch whereby said other switch will be closed when the ignition switch is in "on" position and opened when the ignition switch is in "off" position.

8. In a locking mechanism for a door of a motor vehicle wherein the door is provided with a latch bolt, and means for operating the latch bolt to release it comprising a door handle, and wherein the vehicle has a key-operated ignition switch movable by a key between "on" and "off" positions; a solenoid energizable for rendering said operating means operative for releasing the latch bolt upon movement of the door handle, a circuit for said solenoid including a master switch, means for moving said master switch to closed position, a solenoid for opening said master switch, and a circuit for said last-named solenoid comprising a pair of switches one of which is manually operable to close such circuit if the other switch is closed, said other switch being mechanically operable by the ignition switch to be closed when the ignition switch is in "on" position and opened when the ignition switch is in "off" position.

9. In a locking mechanism for a door of a motor vehicle wherein the door is provided with a latch bolt, and means for operating the latch bolt to release it comprising a door handle, and wherein the vehicle has a key-operated ignition switch movable by a key between "on" and "off" positions; electro-magnetic means energizable for rendering said operating means operative for releasing the latch bolt, a circuit for said electro-magnetic means comprising a pair of switches one of which is closed by initial door-opening movement of the door handle and the other of which is a master switch, a first solenoid for closing said master switch, a second solenoid for opening said master switch, and a circuit for said second solenoid comprising a pair of switches one of which is manually operated and the other of which is associated with the ignition switch, said last-named switch being controlled by the ignition switch to be closed when the ignition switch is in "on" position and opened when the ignition switch is in "off" position.

10. In a locking mechanism for a door of a motor vehicle wherein the door is provided with a latch bolt, and means for operating the latch bolt to release it comprising a door handle, and wherein the vehicle has a key-operated ignition switch movable by a key between "on" and "off" positions; electro-magnetic means energizable for rendering said operating means operative for releasing the latch bolt, a circuit for said electro-magnetic means comprising a pair of switches one of which is closed by initial door-opening movement of the door handle and the other of which is a master switch, a first solenoid for closing said master switch, a second solenoid for opening said master switch, and a circuit for said second solenoid comprising a pair of switches one of which is manually operated and the other of which is associated with the ignition switch, the ignition switch having a rotatable barrel provided with a cam groove formed therein perpendicular to the axis of rotation of said barrel, and a pin engageable with said barrel and engaging said last-named switch to open it when the ignition switch is in "off" position, said pin being movable into said cam groove for the closing of said last-named switch when the ignition switch is in "on" position.

11. In a locking mechanism for a door of a motor vehicle wherein the door is provided with a latch bolt, means for operating the latch bolt to release it, comprising a door handle, and wherein the vehicle has a key-operated ignition switch movable by a key between "on" and "off" positions; said operating means being normally ineffective for releasing the latch bolt, control means for said operating means adapted to assume two conditions in which it is respectively operative and inoperative for rendering said operating means effective for releasing the latch bolt upon operation of the door handle, and means operated by the ignition key when the ignition switch is in "off" position for maintaining the operative condition of said control means.

12. In a locking mechanism for a door of a motor vehicle wherein the door is provided with a latch bolt, means for operating the latch bolt to release it, comprising a door handle, and wherein the vehicle has a key-operated ignition switch movable by a key between "on" and "off" positions; said operating means being normally ineffective for releasing the latch bolt, control means for said operating means adapted to assume two conditions in which it is respectively operative and inoperative for rendering said operating means effective for releasing the latch bolt upon operation of the door handle, and means comprising an electric switch operated by the ignition key when the ignition switch is in "off" position for maintaining the operative condition of said control means.

13. In a locking mechanism for a door of a motor vehicle wherein the door is provided with a latch bolt, means for operating the latch bolt to release it, comprising a door handle, and wherein the vehicle has a key-operated ignition switch movable by a key between "on" and "off" positions; said operating means being normally ineffective for releasing the latch bolt, control means for said operating means adapted to assume two conditions in which it is respectively operative and inoperative for rendering said operating means effective for releasing the latch bolt upon operation of the door handle, a circuit energizable for establishing the inoperative condition of said control means, and means operable by the ignition switch key when the ignition switch is in "off" position to maintain said circuit open.

14. In a locking mechanism for a door of a motor vehicle wherein the door is provided with a latch bolt, means for operating the latch bolt to release it, comprising a door handle, and wherein the vehicle has a key-operated ignition switch movable by a key between "on" and "off" positions; said operating means being normally ineffective for releasing the latch bolt, control means for said operating means adapted to assume two conditions in which it is respectively operative and inoperative for rendering said operating means effective for releasing the latch bolt upon operation of the door handle, a first circuit energizable for establishing the inoperative condition of said control means, and a second circuit including a switch movable by the ignition switch when the latter is in "off" position to maintain said first circuit open.

15. In a locking mechanism for a door of a motor vehicle wherein the door is provided with a latch bolt, and inside and outside handles for operating the latch bolt; means connecting the inside door handle to the latch bolt to operate it, operating connections between the outside door handle and the latch bolt for operating the latter upon operation of the outside door handle, said operating connections being normally ineffective for releasing the latch bolt, control means for said operating connections adapted to assume two conditions in which it is respectively operative and inoperative for rendering said operating connections effective for releasing the latch bolt upon operation of the door handle, manual means operative for establishing the inoperative condition of said control means, means operable by the inside door handle for establishing the operative condition of said control means, and means operable by the ignition key when the ignition switch is in "off" position for rendering said manual means inoperative.

16. Apparatus constructed in accordance with claim 15 wherein said manual means comprises an electric circuit, said means operated by the ignition key comprising a switch for maintaining said circuit open when the ignition switch is in "off" position.

DAVID T. AYERS, Jr.

REFERENCES CITED

The following references are of record in the file of this patent:

UNITED STATES PATENTS

| Number | Name | Date |
| --- | --- | --- |
| 1,699,398 | Lach | Jan. 15, 1929 |
| 2,162,567 | Shobel et al. | June 13, 1939 |
| 2,329,309 | Ward et al. | Sept. 14, 1943 |